(12) United States Patent
Wang

(10) Patent No.: US 12,443,554 B1
(45) Date of Patent: Oct. 14, 2025

(54) BACKPLANE SLOT DETECTION METHOD AND BACKPLANE SLOT DETECTION SYSTEM FOR APPLYING A SCALABLE BACKPLANE ARRAY

(71) Applicant: Moxa Inc., New Taipei (TW)

(72) Inventor: Sheng-Hung Wang, New Taipei (TW)

(73) Assignee: Moxa Inc., New Taipei (TW)

( * ) Notice: Subject to any disclaimer, the term of this patent is extended or adjusted under 35 U.S.C. 154(b) by 109 days.

(21) Appl. No.: 18/621,133

(22) Filed: Mar. 29, 2024

(51) Int. Cl.
*G06F 13/40* (2006.01)

(52) U.S. Cl.
CPC ...... *G06F 13/4063* (2013.01); *G06F 2213/40* (2013.01)

(58) Field of Classification Search
CPC ............. G06F 13/4063; G06F 9/4413; G06F 2213/40; G05B 2219/24025
See application file for complete search history.

(56) References Cited

U.S. PATENT DOCUMENTS

| | | | | |
|---|---|---|---|---|
| 5,132,635 A | * | 7/1992 | Kennedy | G01R 31/318558 324/763.01 |
| 8,441,942 B1 | * | 5/2013 | Guha | H04L 45/28 370/242 |
| 2002/0196611 A1 | * | 12/2002 | Ho | G06F 13/4081 361/752 |
| 2012/0039188 A1 | * | 2/2012 | Fan | H04L 43/50 370/249 |
| 2015/0036479 A1 | * | 2/2015 | Gopalarathnam | H04L 41/0813 370/218 |
| 2018/0139093 A1 | * | 5/2018 | Pan | H04L 43/00 |
| 2020/0389359 A1 | * | 12/2020 | Lopez | H04L 41/0806 |

* cited by examiner

*Primary Examiner* — Phong H Dang
(74) *Attorney, Agent, or Firm* — Winston Hsu

(57) ABSTRACT

A backplane slot detection method includes providing a detection module and a first communication interface, wherein the first communication interface is configured to transfer data between the detection module and a first backplane, transmitting a first detection packet from the detection module via the first communication interface, receiving a first received packet by the detection module, detecting a first loopback operation according to the first detection packet and the first received packet by the detection module, and determining whether a first slot of the first backplane is present according to a detection of the first loopback operation.

12 Claims, 7 Drawing Sheets

BACKPLANE SLOT DETECTION METHOD AND BACKPLANE SLOT DETECTION SYSTEM FOR APPLYING A SCALABLE BACKPLANE ARRAY

BACKGROUND OF THE INVENTION

1. Field of the Invention

The present invention illustrates a backplane slot detection method and a backplane slot detection system, and more particularly, a backplane slot detection method and a backplane slot detection system for applying a scalable backplane array.

2. Description of the Prior Art

With the rapid development of science and technology, various modules are popularly applied to a backplane for performing different functions. For operational convenience, different scalable backplanes having specific modules can be integrated or combined as a backplane array system for performing customized functions. Here, in the backplane array system, one backplane can be replaced with another backplane for performing another function.

However, conventional backplane slot detection method for various scalable backplanes may introduce additional hardware cost. For example, a pin may be used for slot detection. However, since much more functions are applied to the backplane and modules, the pins may be insufficient. Therefore, developing an efficient and convenient backplane slot detection system for applying to the scalable backplane array is an important design issue.

SUMMARY OF THE INVENTION

In an embodiment of the present invention, a backplane slot detection method is disclosed. The backplane slot detection method comprises providing a detection module and a first communication interface, wherein the first communication interface is configured to transfer data between the detection module and a first backplane, transmitting a first detection packet from the detection module via the first communication interface, receiving a first received packet by the detection module, detecting a first loopback operation according to the first detection packet and the first received packet by the detection module, and determining whether a first slot of the first backplane is present according to a detection of the first loopback operation.

In another embodiment of the present invention, a backplane slot detection system is disclosed. The backplane slot detection system comprises a detection module, a first communication interface connected to the detection module, and a first backplane. The first communication interface is configured to transfer data between the detection module and the first backplane. The detection module transmits a first detection packet via the first communication interface. The detection module receives a first received packet. The detection module detects a first loopback operation according to the first detection packet and the first received packet. The detection module determines whether a first slot of the first backplane is present according to a detection of the first loopback operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
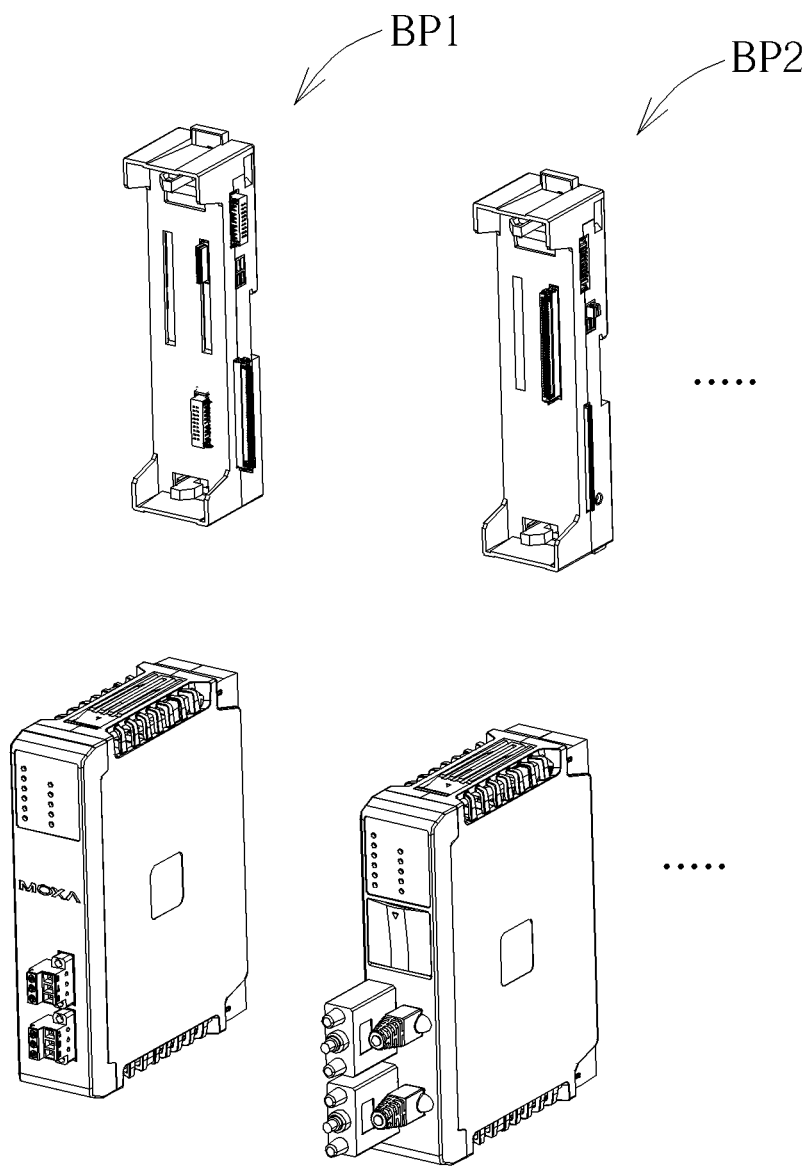
FIG. 1 is an appearance of an electronic device used for deploying a backplane slot detection system according to the embodiment of the present invention.

FIG. 1 is an appearance of an electronic device 1 used for deploying a backplane slot detection system 100 according to the embodiment of the present invention. As shown in FIG. 1, the backplane detection system 100 can be deployed in an electronic device 1. The electronic device 1 includes a plurality of backplanes BP1 and BP2, and each of the backplanes BP1 and BP2 is detachable to each other. Each of the backplanes BP1 and BP2 has at least one slot and module(s) (for example, a CPU module, a power module and a switch module) inserted to the slot(s) of the backplanes BP1 and BP2 to form a functionary device. For example, the electronic device 1 can be a remote terminal unit detachably mounted on a rail component, e.g., a retractable DIN rail.

Figure 2:
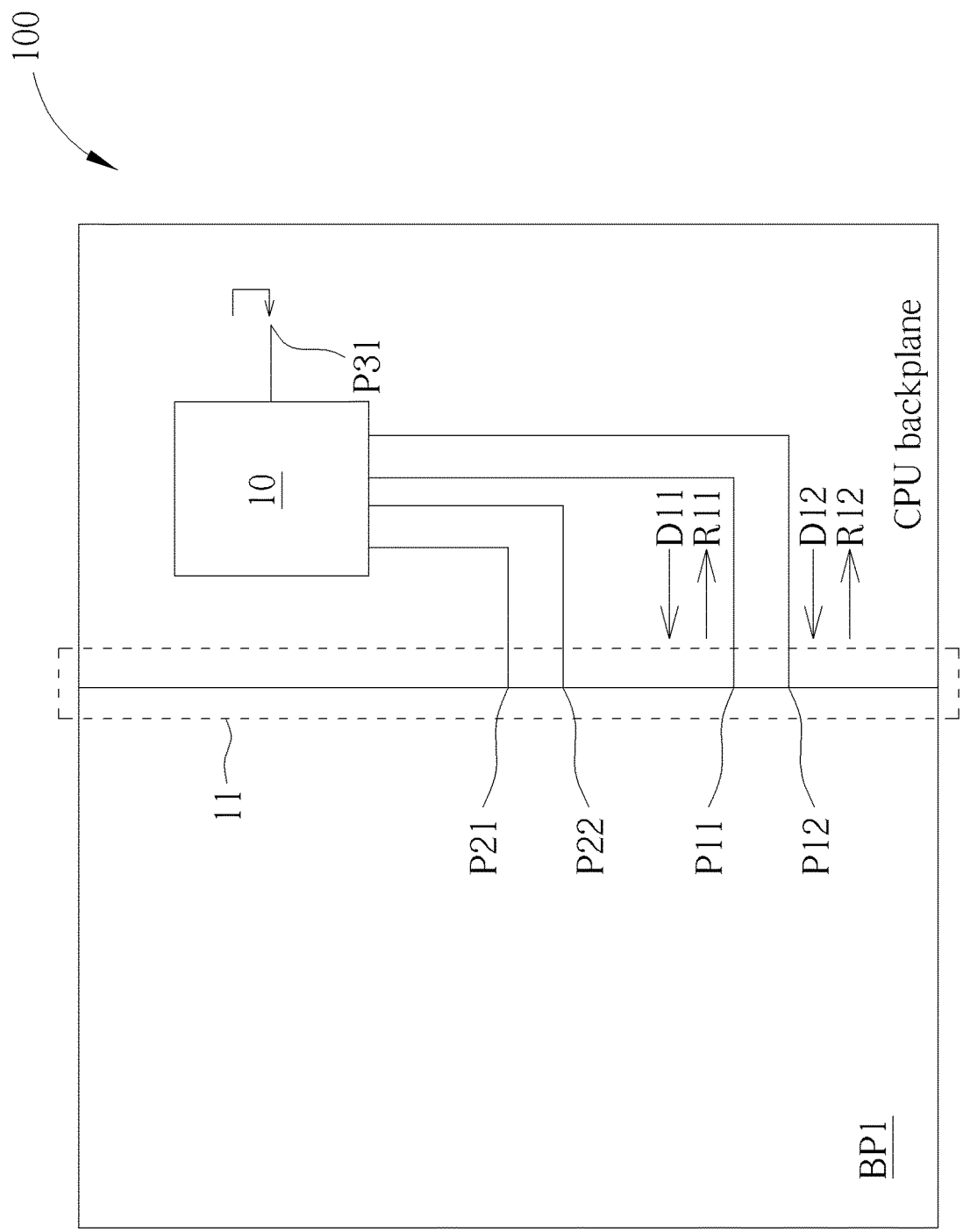
FIG. 2 is a block diagram of a backplane slot detection system according to the embodiment of the present invention.

FIG. 2 is a block diagram of a backplane slot detection system 100 according to the embodiment of the present invention. The backplane slot detection system 100 can include a detection module 10, a first communication interface 11, and a first backplane BP1. The first backplane BP1 can be a backplane having at least one first slot for inserting at least one module. The detection module 10 can be used for detecting at least one first slot of the first backplane BP1. The first communication interface 11 is connected to the detection module 10. For example, the first communication interface 11 can be an Ethernet interface or a serial data (such as RS232/422/485) interface. The first communication interface 11 is used for transferring data between the detection module 10 and the first backplane BP1. The first communication interface 11 may include at least one first connection terminal. The first connection terminal is reserved for connecting to the respective first slot. Accordingly, packets (including data packets) can be transmitted between the detection module 10 and the first slots of the first backplane BP1 via the first connection terminal. Specifically, a detection packet for detecting the first slot may be transmitted from the detection module 10 to the backplane BP1. In FIG. 2 and following illustration, the first communication interface 11 can include two first connection terminals P11 and P12. However, the backplane slot detection system 100 is not limited to the number of first connection terminals in FIG. 1. For example, three or more connection terminals can be used for detecting a large-scale backplane including three or more slots. In the backplane slot detection system 100, the detection module 10 may receive a first received packet (for example, the first received packet R11) via the first connection terminal P11 of the first communication interface 11 for detecting a first loopback operation. Then, the detection module 10 can determine whether a first slot of the first backplane is present according to a detection of the first loopback operation. Further, detection module 10 may receive a plurality of first received packets (for example, the first received packets R11 and R12) via the plurality of first connection terminals P11 and P12 of the first communication interface 11 for detecting a plurality of first loopback operations. Then, the detection module 10 can determine whether the first slots of the first backplane BP1 are present according to detections of the plurality of first loopback operations of the first communication interface 11.

In FIG. 2, the detection module 10 can be a central processing unit (CPU) module. In an embodiment, the detection module 10 can include a core processor. The core processor can generate a first detection packet to the first communication interface 11. In FIG. 2, the detection module 10 including the core processor is simplified as the detection module 10 hereafter. The detection module 10 can generate a first detection packet D11 to the first connection terminal P11 of the first communication interface 11. Similarly, the detection module 10 can generate a first detection packet D12 to the first connection terminal P12 of the first communication interface 11. In another embodiment, when the number of Ethernet ports of the core processor is insufficient, at least one switch controller can be introduced to the detection module 10 for transmitting detection packets from the core processor to the first communication interface 11.

Details of performing a backplane slot detection method are illustrated below.

Figure 3:
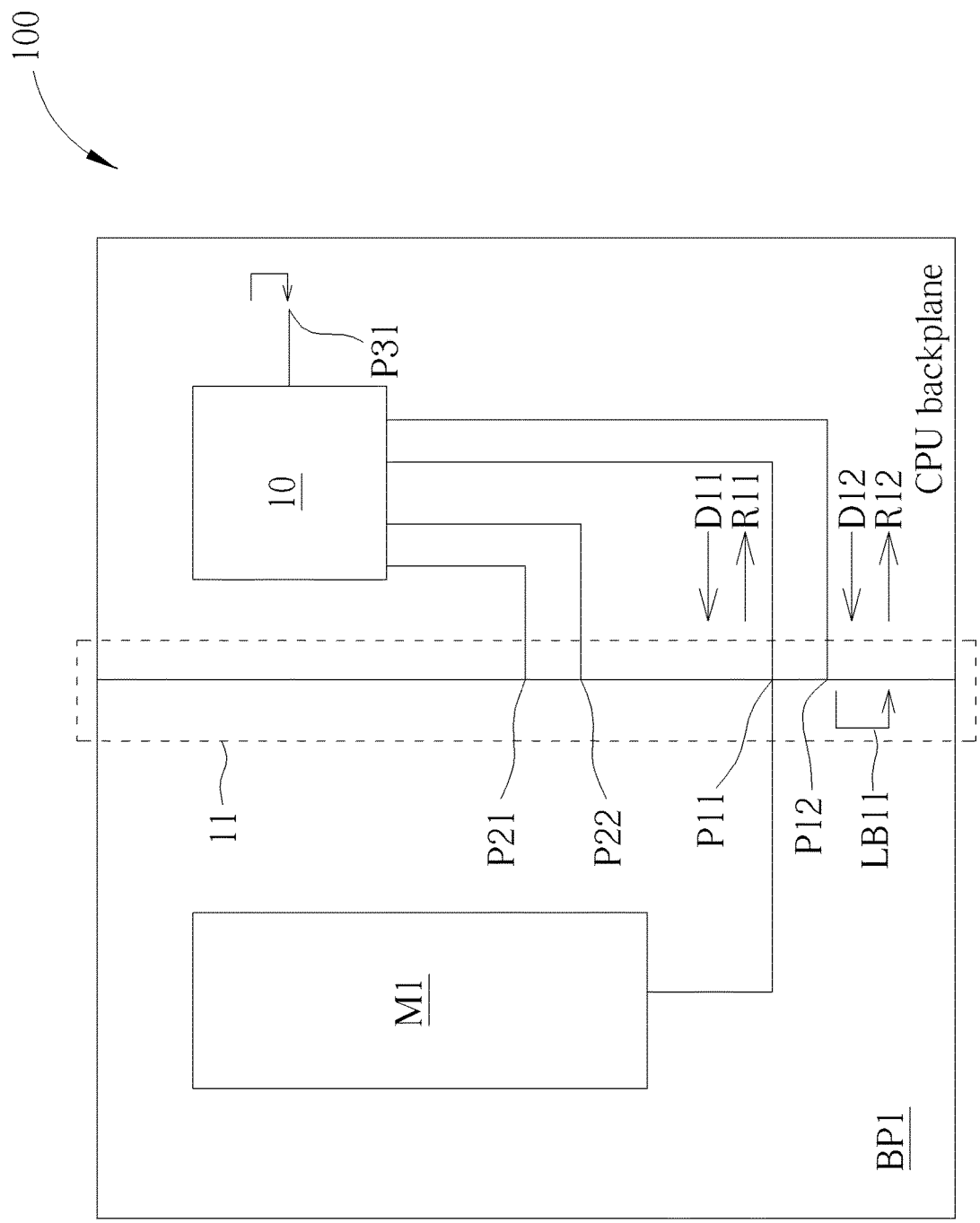
FIG. 3 is an illustration of detecting a first backplane having a single slot by a detection module of the backplane slot detection system.

FIG. 3 is an illustration of detecting a first backplane BP1 having a single slot by the detection module 10 of the backplane slot detection system 100. When the first backplane BP1 is a single-slot backplane, the first backplane BP1 includes only one slot connectable with the first connection terminal P11, denoted as a first slot M1. A circuit corresponding to the first connection terminal P12 may be designed to form a first loopback circuit from the first connection terminal P12. Accordingly, after the first detection packets D11 and D12 are sent by the detection module 10 through the first connection terminals P11 and P12, a first loopback operation LB11 of the first communication interface 11 on the first connection terminal P12 can be detected by the detection module 10.

Details of detecting whether the first loopback operation is present on the first connection terminal P11 and the first connection terminal P12 of the first communication interface 11 are illustrated below. When the first detection packets D11 and D12 are sent by the detection module 10, the first slot M1 receiving the first detection packet D11 may or may not return any packet, and the first detection packet D12 may be returned to the first connection terminal P12 via the first loopback circuit. In this embodiment, a first received packet R11 is sent from the first slot M1 to the first connection terminal P11. The first connection terminal P12 receives a first received packet R12 (i.e., defined as the returned detection packet D12). The detection module 10 may compare the first received packet R11 with the first detection packet D11, and may compare the first received packet R12 with the first detection packet D12. Then, the first loopback operations can be determined accordingly. For example, when the first slot M1 exists, the first received packet R11 can be a null signal since no responding (or returning) packet is generated. For example, when the first slot M1 and a corresponding module exist, the first received packet R11 can be generated by the module inserted to the first slot M1. The detection module 10 can compare the first detection packet D11 with the first received packet R11 of the first connection terminal P11. Here, since the first detection packet D11 and the first received packet R11 are different, no loopback operation of the first connection terminal P11 is detected by the detection module 10. For the first connection terminal P12, the detection module 10 sends the first detection packet D12 to the first connection terminal P12. Then, the detection module 10 can receive the first received packet R12 from the first connection terminal P12. Here, since the first backplane BP1 is a single-slot backplane, the first detection packet D12 is returned as being the first received packet R12 of the first connection terminal P12. As a result, the first detection packet D12 and the first received packet R12 are identical. The detection module 10 can compare the first detection packet D12 with the first received packet R12 of the first connection terminal P12. Here, since the first detection packet D12 and the first received packet R12 are identical, the first loopback operation LB11 of the first connection terminal P12 can be detected by the detection module 10. As a result, in FIG. 3, when the first detection packet D12 and the first received packet R12 are identical, and the first detection packet D11 and the first received packet R11 are different, it implies that the first backplane BP1 is the single-slot backplane.

Figure 4:
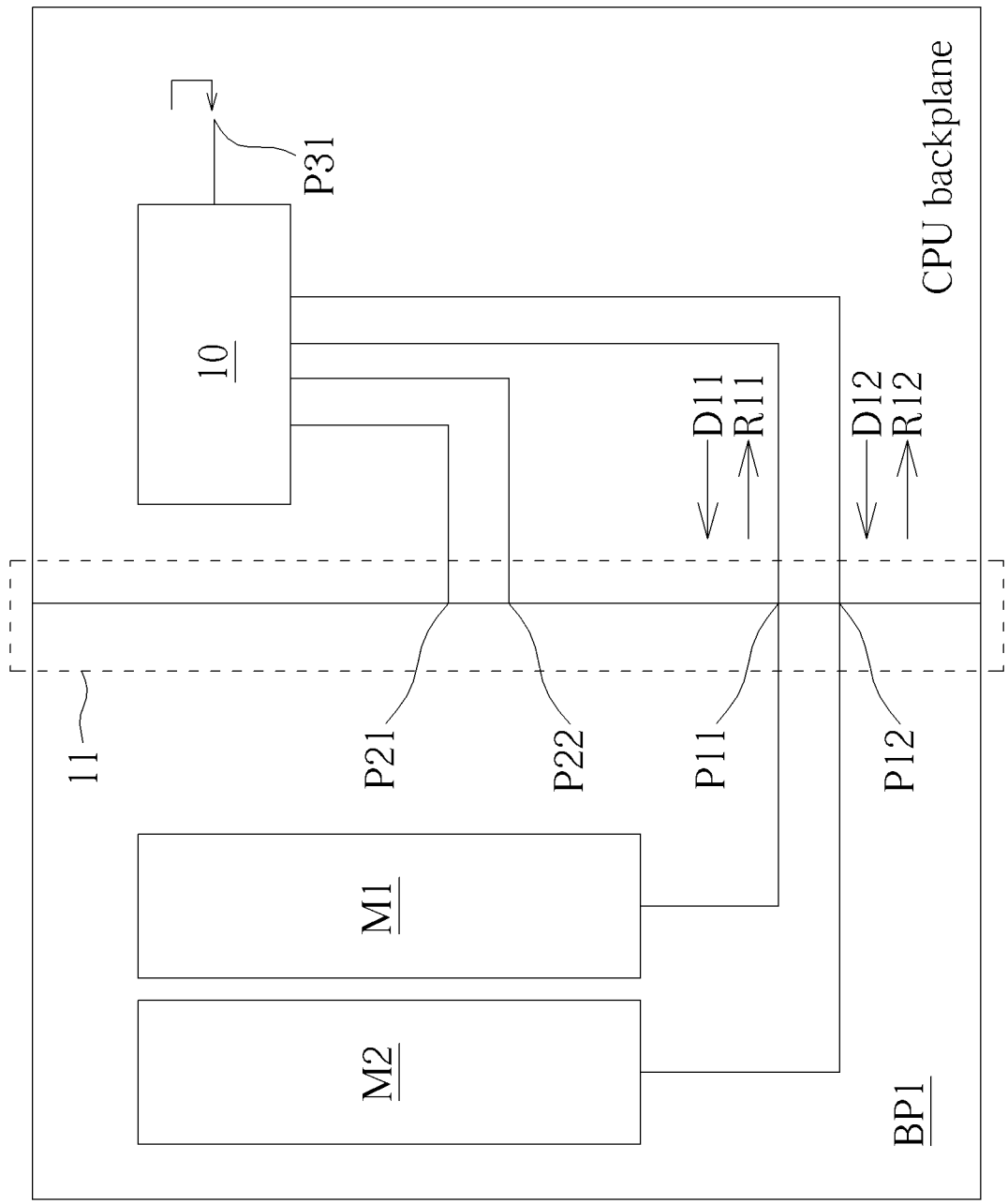
FIG. 4 is an illustration of detecting a first backplane having dual slots by the detection module of the backplane slot detection system.

FIG. 4 is an illustration of detecting a first backplane BP1 having dual slots by the detection module 10 of the backplane slot detection system 100. When the first backplane BP1 is a dual-slot backplane, the first backplane BP1 includes two slots connectable with first connection terminals P11 and P12, denoted as first slots M1 and M2. No loopback circuit is introduced to the first connection terminals P11 and P12. In this embodiment, after the first detection packets D11 and D12 are sent by the detection module 10 through the first connection terminals P11 and P12, no loopback operation of the first communication interface 11 on the first connection terminals P11 and P12 is detected by the detection module 10.

Details of detecting whether the first loopback operation is present on the first connection terminals P11 and P12 of the first communication interface 11 are illustrated below. When the first detection packets D11 and D12 are sent by the detection module 10, the first slot M1 receiving the first detection packet D11 may or may not return any packet, and the first slot M2 receiving the first detection packet D12 may or may not return any packet. In this embodiment, for example, when the first slot M1 exists, the first received packet R11 can be a null signal since no responding (or returning) packet is generated. For example, when the first slot M1 and the corresponding module exist, the first received packet R11 can be generated by the module inserted to the first slot M1. Similarly, when the first slot M2 exists, the first received packet R12 can be a null signal since no responding (or returning) packet is generated. For example, when the first slot M2 and the corresponding module exist, the first received packet R12 can be generated by the module inserted to the first slot M2. The detection module 10 can compare the first detection packet D11 with the first received packet R11 of the first connection terminal P11. Here, since the first detection packet D11 and the first received packet R11 are different, no loopback operation of the first connection terminal P11 is detected by the detection module 10. Similarly, the detection module 10 can compare the first detection packet D12 with the first received packet R12 of the first connection terminal P12. Here, since the first detection packet D12 and the first received packet R12 are different, no loopback operation of the first connection terminal P12 is detected by the detection module 10. As a result, in FIG. 4, when the first detection packet D12 and the first received packet R12 are different, and the first detection packet D11 and the first received packet R11 are different, it implies that the first backplane BP1 is the dual-slot backplane.

In FIG. 2 to FIG. 4, the first backplane BP1 can be a power backplane. The number of loopback operations detected by the detection module 10 for various power backplanes can be expressed in Table T1.

TABLE T1

| power backplane PW | the number of loopback operation of the power backplane PLB |
|---|---|
| PW: single-slot | PLB = 1 |
| PW: dual-slot | PLB = 0 |

Figure 5:
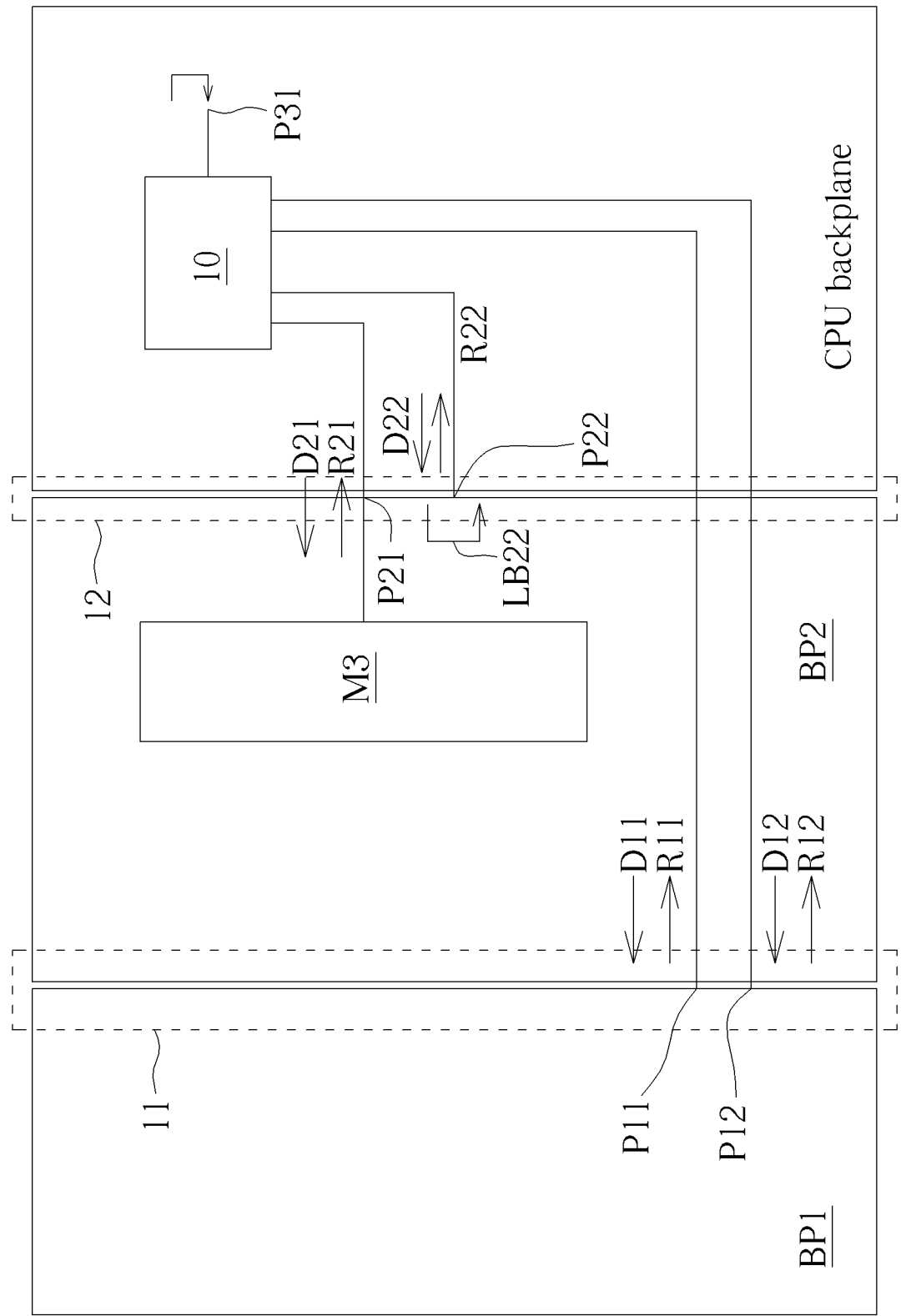
FIG. 5 is an illustration of detecting a first backplane and a second backplane by the detection module of the backplane slot detection system.

FIG. 5 is an illustration of detecting a first backplane BP1 and a second backplane BP2 by the detection module 10 of the backplane slot detection system 100. The backplane slot detection system 100 can detect a plurality of backplanes. For example, the backplane slot detection system 100 can detect the first slot of the first backplane BP1 and the second slot of the second backplane BP2. Details of detecting of the first backplane BP1 are previously illustrated in FIG. 3 and FIG. 4. Thus, they are omitted here. Specifically, the first backplane BP1 can be a single-slot backplane or a dual-slot backplane. The second backplane BP2 can be a single-slot backplane or a dual-slot backplane. For example, in FIG. 5, when the second backplane BP2 is a single-slot backplane, the second backplane BP2 includes only one slot connectable with the second connection terminal P21, denoted as a second slot M3. A second communication interface 12 may include at least one second connection terminal. For example, the second communication interface 12 may include the second connection terminal P21 reserved for connecting to the second slot M3. A circuit corresponding to the second connection terminal P22 may be designed to form a second loopback circuit from the second connection terminal P22. Accordingly, after the second detection packets D21 and D22 are sent by the detection module 10 through the second connection terminals P21 and P22, a second loopback operation LB22 of the second communication interface 12 on the second connection terminal P22 can be detected by the detection module 10.

Details of detecting whether the second loopback operation is present on the second connection terminal P21 and the second connection terminal P22 of the second communication interface 12 are illustrated below. When the second detection packets D21 and D22 are sent by the detection module 10, the second slot M3 receiving the second detection packet D21 may or may not return any packet, and the second detection packet D22 may be returned to the second connection terminal P22 via the second loopback circuit. In this embodiment, a second received packet R21 is sent from the second slot M3 to the second connection terminal P21. The second connection terminal P22 receives a second received packet R22 (i.e., defined as the returned detection packet D22). The detection module 10 may compare the second received packet R21 with the second detection packet D21, and may compare the second received packet R22 with the second detection packet D22. Then, the second loopback operation can be determined accordingly. For example, when the second slot M3 exists, the second received packet R21 can be a null signal since no responding (or returning) packet is generated. For example, when the second slot M3 and a corresponding module exist, the second received packet R21 can be generated by the module inserted to the second slot M3. The detection module 10 can compare the second detection packet D21 with the second received packet R21 of the second connection terminal P21. Here, since the second detection packet D21 and the second received packet R21 are different, no loopback operation of the second connection terminal P21 is detected by the detection module 10. For the second connection terminal P22, the detection module 10 sends the second detection packet D22 to the second connection terminal P22. Then, the detection module 10 can receive the second received packet R22 from the second connection terminal P22. Here, since the second backplane BP2 is a single-slot backplane, the second detection packet D22 is returned as being the second received packet R22 of the second connection terminal P22. As a result, the second detection packet D22 and the second received packet R22 are identical. The detection module 10 can compare the second detection packet D22 with the second received packet R22 of the second connection terminal P22. Here, since the second detection packet D22 and the second received packet R22 are identical, the second loopback operation LB22 of the second connection terminal P22 can be detected by the detection module 10. As a result, in FIG. 5, when the second detection packet D22 and the second received packet R22 are identical, and the second detection packet D21 and the second received packet R21 are different, it implies that the second backplane BP2 is the single-slot backplane.

Further, in FIG. 5, the second backplane BP2 can be a dual-slot backplane. The method of detecting the dual-slot backplane is previously illustrated in FIG. 4. Additionally, all possible backplane type combinations (i.e., the first backplane BP1: one slot or two slots, the second backplane BP2: one slot or two slots) can be referred to aforementioned embodiments in FIG. 3 and FIG. 4. Therefore, details are omitted here.

In FIG. 5, the first backplane BP1 can be the power backplane. The second backplane BP2 can be a switch backplane. The number of loopback operations detected by the detection module 10 for various power backplanes and various switch backplanes can be expressed in Table T2.

TABLE T2

| power backplane PW; switch backplane SW; | the number of loopback operation of the power backplane PLB; the number of loopback operation of the switch backplane SLB; |
|---|---|
| PW: single-slot | PLB = 1 |
|  | SLB = 2 |
| PW: dual-slot | PLB = 0 |
|  | SLB = 2 |
| PW: single-slot | PLB = 1 |
| SW: single-slot | SLB = 1 |
| PW: dual-slot | PLB = 0 |
| SW: single-slot | SLB = 1 |
| PW: single-slot | PLB = 1 |

TABLE T2-continued

| power backplane PW; switch backplane SW; | the number of loopback operation of the power backplane PLB; the number of loopback operation of the switch backplane SLB; |
|---|---|
| SW: dual-slot | SLB = 0 |
| PW: dual-slot | PLB = 0 |
| SW: dual-slot | SLB = 0 |

Figure 6:
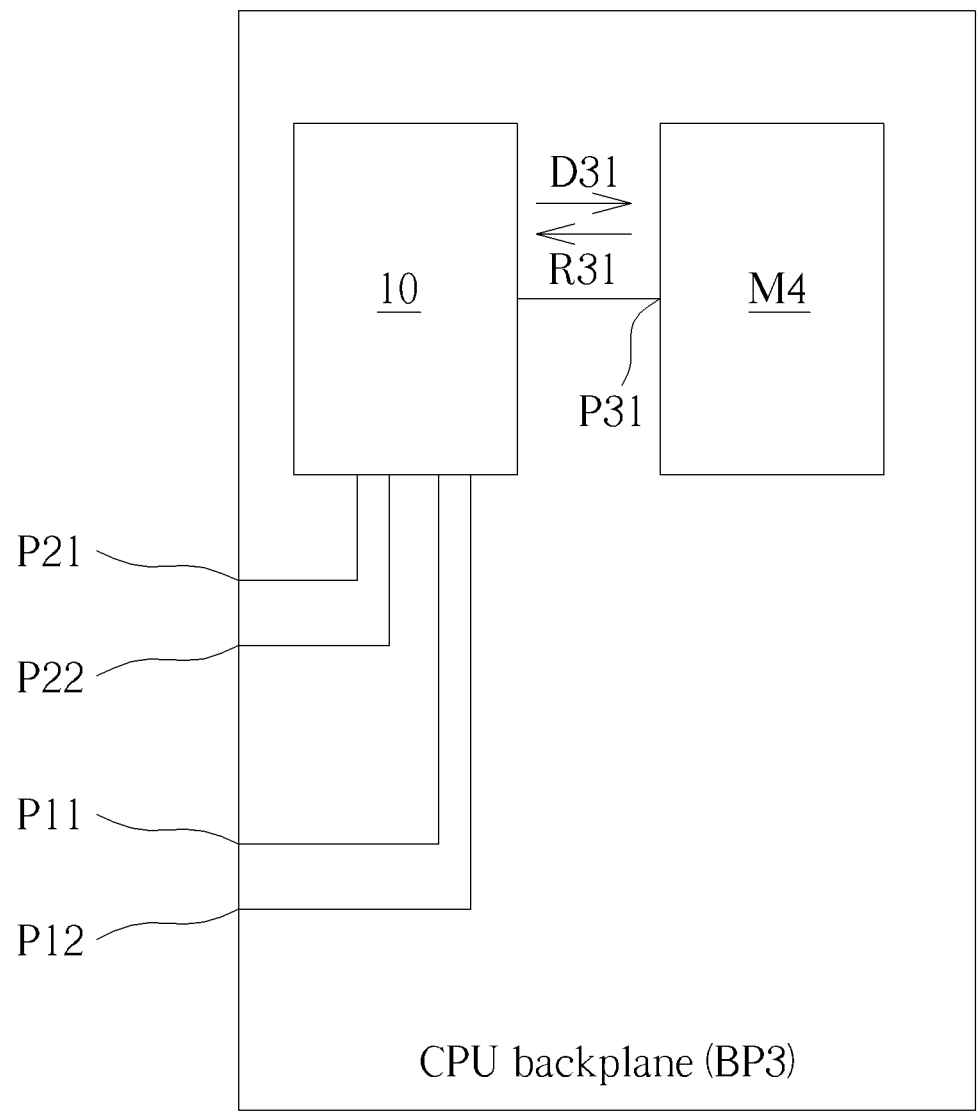
FIG. 6 is an illustration of self-detecting a central processing unit (CPU) backplane by the detection module 10 disposed on the CPU backplane of the backplane slot detection system.

FIG. 6 is an illustration of self-detecting a central processing unit (CPU) backplane by the detection module 10 disposed on the CPU backplane of the backplane slot detection system 100. In this embodiment, the first backplane BP can be the CPU backplane. For avoiding ambiguity, the CPU backplane is called as a third backplane BP3 hereafter. Here, the detection module 10 can send a third detection packet D31 to the third connection terminal P31. Further, a third received packet R31 can be received by the detection module 10 through the third connection terminal P31. Similarly, the detection module 10 can compare the third detection packet D31 and the third received packet R31. When a third loopback operation of the third backplane BP3 is detected, the third backplane BP3 is determined as a single-slot backplane by the detection module 10. Conversely, when no loopback operation of the third backplane BP3 is detected, the third backplane BP3 is determined as a dual-slot backplane by the detection module 10.

In FIG. 2 to FIG. 7, the CPU backplane, the power backplane, and the switch backplane can be introduced to the backplane slot detection system 100. The number of loopback operations detected by the detection module 10 for various CPU backplanes, various power backplanes, and various switch backplanes can be expressed in Table T3.

TABLE T3

| power backplane PW switch backplane SW CPU backplane CTR | the number of loopback operation of the power backplane PLB; the number of loopback operation of the switch backplane SLB; the number of loopback operation of the CPU backplane CLB; |
|---|---|
| PW: single-slot CTR: single-slot | PLB = 1 SLB = 2 CLB = 1 |
| PW: single-slot CTR: dual-slot | PLB = 1 SLB = 2 CLB = 0 |
| PW: dual-slot CTR: single-slot | PLB = 0 SLB = 2 CLB = 1 |
| PW: dual-slot CTR: dual-slot | PLB = 0 SLB = 2 CLB = 0 |
| PW: single-slot SW: single-slot CTR: single-slot | PLB = 1 SLB = 1 CLB = 1 |
| PW: single-slot SW: single-slot CTR: dual-slot | PLB = 1 SLB = 1 CLB = 0 |
| PW: dual-slot SW: single-slot CTR: single-slot | PLB = 0 SLB = 1 CLB = 1 |
| PW: dual-slot SW: single-slot CTR: dual-slot | PLB = 0 SLB = 1 CLB = 0 |
| PW: single-slot SW: dual-slot CTR: single-slot | PLB = 1 SLB = 0 CLB = 1 |
| PW: single-slot SW: dual-slot | PLB = 1 SLB = 0 |

TABLE T3-continued

| power backplane PW switch backplane SW CPU backplane CTR | the number of loopback operation of the power backplane PLB; the number of loopback operation of the switch backplane SLB; the number of loopback operation of the CPU backplane CLB; |
|---|---|
| CTR: dual-slot PW: dual-slot SW: dual-slot CTR: single-slot PW: dual-slot SW: dual-slot CTR: dual-slot | CLB = 0 PLB = 0 SLB = 0 CLB = 1 PLB = 0 SLB = 0 CLB = 0 |

Figure 7:
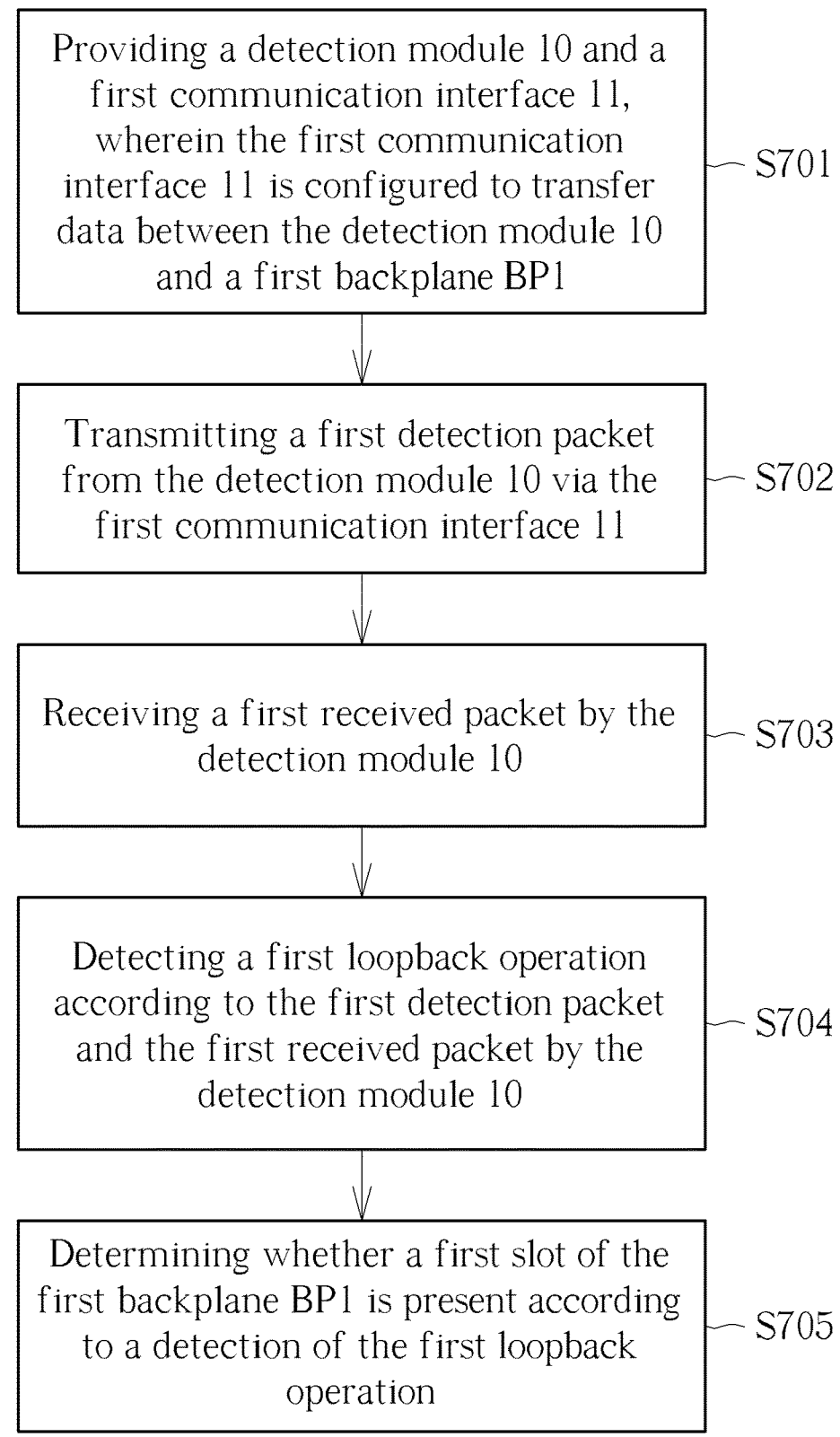
FIG. 7 is a flow chart of performing a backplane slot detection method by the backplane slot detection system.

FIG. 7 is a flow chart of performing a backplane slot detection method by the backplane slot detection system 100. The backplane slot detection method includes step S701 to step S705. Step S701 to step S705 are illustrated below.

step S701: providing a detection module 10 and a first communication interface 11, wherein the first communication interface 11 is configured to transfer data between the detection module 10 and a first backplane BP1;

step S702: transmitting a first detection packet from the detection module 10 via the first communication interface 11;

step S703: receiving a first received packet by the detection module 10;

step S704: detecting a first loopback operation according to the first detection packet and the first received packet by the detection module 10;

step S705: determining whether a first slot of the first backplane BP1 is present according to a detection of the first loopback operation.

Details of step S701 to step S705 are previously illustrated. Thus, they are omitted here. In the backplane slot detection system 100, the existence of the loopback operation can be determined by the detection module 10 according to the first detection packet and the first received packet. Further, the backplane of the backplane slot detection system 100 is not limited to the single-slot backplane or the dual-slot backplane. For example, when no loopback operation of N connection terminals is detected, it implies that each of N connection terminals is coupled to a corresponding slot. As a result, the first backplane BP1 can be determined as an N-slot backplane. N can be greater than two.

To sum up, the present invention discloses a backplane slot detection method and a backplane slot detection system. The backplane slot detection system can use a detection packet and a received packet for detecting a loopback operation of a backplane. Then, the backplane slot detection system can detect the existence of at least one slot for the backplane according to the loopback operation. Therefore, the backplane slot detection system can be applied to a scalable array for providing an efficient and low-complexity slot detection function.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backplane slot detection method comprising:
 providing a detection module and a first communication interface, wherein the first communication interface is configured to transfer data between the detection module and a first backplane;
 transmitting a first detection packet from the detection module via the first communication interface;
 receiving a first received packet by the detection module;
 detecting a first loopback operation according to the first detection packet and the first received packet by the detection module; and
 determining whether a first slot of the first backplane is present according to a detection of the first loopback operation.

2. The method of claim 1, wherein the step of detecting the first loopback operation according to the first detection packet and the first received packet by the detection module comprises:
 comparing the first detection packet with the first received packet; and
 detecting the first loopback operation after the first detection packet and the first received packet are compared.

3. The method of claim 2, wherein:
 when the first detection packet and the first received packet are identical, the first loopback operation is detected, and
 when the first detection packet and the first received packet are different, no first loopback operation is detected.

4. The method of claim 1, wherein when the first loopback operation is not detected, the first slot of the first backplane is present.

5. The method of claim 1, wherein the first communication interface comprises a plurality of first connection terminals, each of the first connection terminals is reserved for connecting to the first slot of the first backplane, the method further comprises:
 transmitting a plurality of the first detection packets from the detection module via the each of the first connection terminals;
 receiving a plurality of the first received packets by the detection module;
 detecting a plurality of the first loopback operations according to the plurality of the first detection packets and the plurality of the first received packets by the detection module; and
 determining whether the first slots of the first backplane corresponding to the first connection terminals are present according to detections of the plurality of the first loopback operations.

6. The method of claim 1, wherein the detection module is disposed on the first backplane.

7. A backplane slot detection system comprising:
 a detection module;
 a first communication interface connected to the detection module; and
 a first backplane;
 wherein the first communication interface is configured to transfer data between the detection module and the first backplane, the detection module transmits a first detection packet via the first communication interface, the detection module receives a first received packet, the detection module detects a first loopback operation according to the first detection packet and the first received packet, and the detection module determines whether a first slot of the first backplane is present according to a detection of the first loopback operation.

8. The system of claim 7, wherein the detection module compares the first detection packet with the first received packet, and the detection module detects the first loopback operation after the first detection packet and the first received packet are compared.

9. The system of claim 8, wherein:
 when the first detection packet and the first received packet are identical, the first loopback operation is detected, and
 when the first detection packet and the first received packet are different, no first loopback operation is detected.

10. The system of claim 7, wherein when the first loopback operation is not detected, the first slot of the first backplane is present.

11. The system of claim 7, wherein the first communication interface comprises a plurality of first connection terminals, each of the first connection terminals is reserved for connecting to the first slot of the first backplane, the detection module transmits a plurality of the first detection packets via the each of the first connection terminals, the detection module receives a plurality of the first received packets, the detection module detects a plurality of the first loopback operations according to the plurality of the first detection packets and the plurality of the first received packets, and the detection module determines whether the first slots of the first backplane corresponding to the first connection terminals are present according to detections of the plurality of the first loopback operations.

12. The system of claim 7, wherein the detection module is disposed on the first backplane.

* * * * *